April 5, 1927.
C. FERGUSON
1,623,535
ATTACHMENT FOR BEVERAGE MIXERS
Filed Feb. 24, 1925
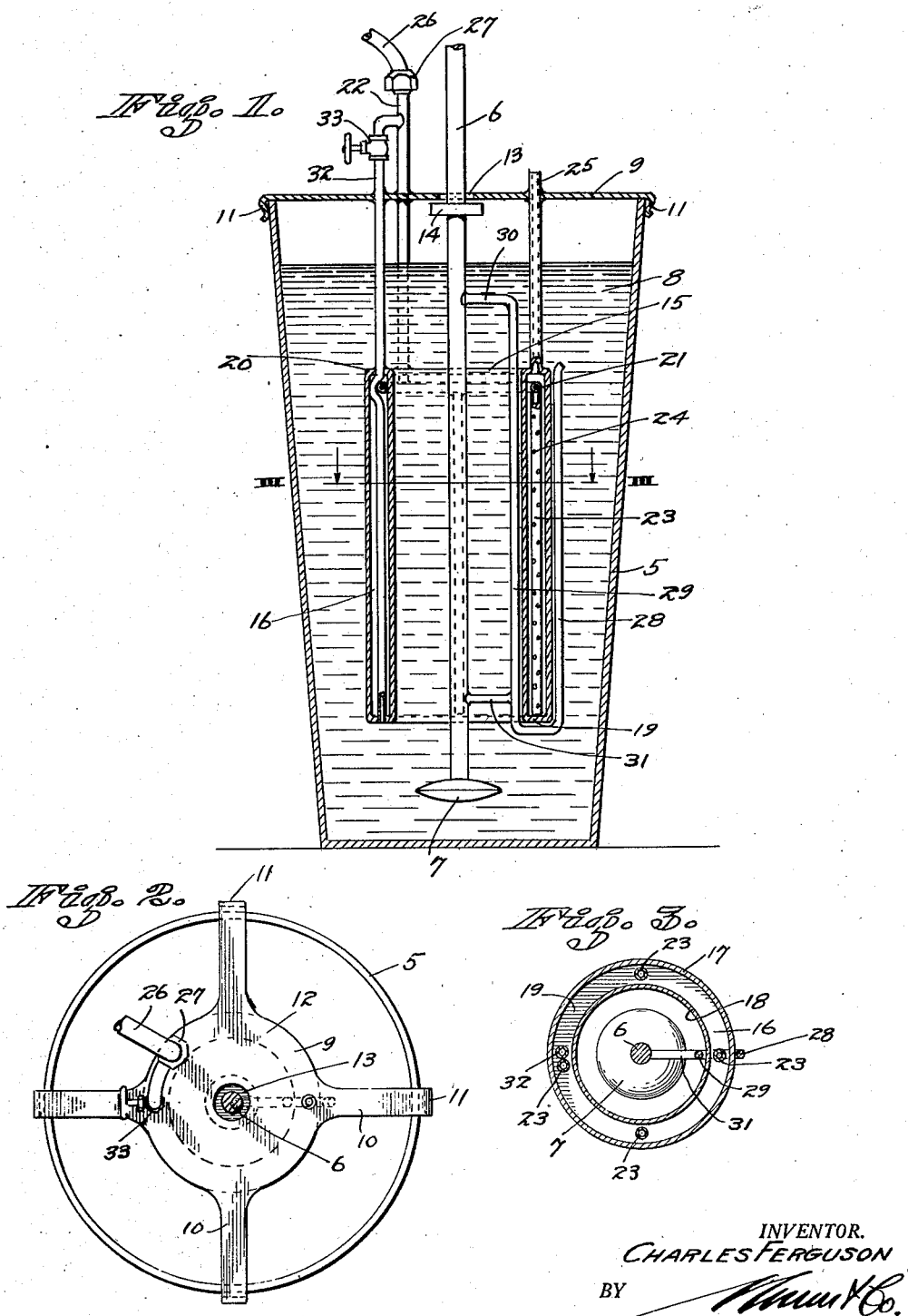
INVENTOR.
CHARLES FERGUSON
BY
ATTORNEYS.

Patented Apr. 5, 1927.

1,623,535

UNITED STATES PATENT OFFICE.

CHARLES FERGUSON, OF SPOKANE, WASHINGTON.

ATTACHMENT FOR BEVERAGE MIXERS.

Application filed February 24, 1925. Serial No. 11,317.

This invention relates to improvements in mixers for beverages and the like. The general object of the invention is the provision of a means for modifying, when required, the temperature of a beverage either preparatory, subsequent or during the operating of mixing the same.

Other objects will appear and be better understood from that embodiment of my invention of which the following is a description, reference to be made to the drawings which form part of the description and in which:

Figure 1 is a vertical cross-section of a beverage mixer showing my device partly in vertical cross-section and in side elevation and applied thereto.

Figure 2 is a plan view of Figure 1, and

Figure 3 is a sectional plan view on the line III—III of Figure 1, looking in the direction of the arrows.

In the drawings 5 indicates the conventional form of receptacle used in connection with the mixing of beverages such as malted milk and the like. An agitator shaft 6 terminating at its lower end in a head 7 extends downwardly through the upper open end of receptacle 5 and into the fluid constituting the beverage 8. In practical use the shaft is operated electro-mechanically by a motor, not shown, to which it is suitably connected so that it may be elevated for an appreciable distance with respect to the beverage 8 in order that adjustment of the receptacle 5 into the position shown in Figure 1 and also the removal of the receptacle may be effected. The parts thus far described are of old and well known construction, and are in every day use in connection with so-called soda fountains; a bracket, not shown, being usually provided for the receptacle 5 for holding it in the position shown in Figure 1 during the operation of the shaft 6 and the button 7 to agitate and thereby mix the beverage.

Coming now to the present invention, a support 9 is adapted to engage the upper open end of receptacle 5 and may as shown be formed of resilient metal and provided with a plurality of radially extending arms 10 adapted at one end to extend over the edge of receptacle 5. The said arms 10 terminate in extensions 11 having compound curvatures so as to frictionally bind on receptacle 5 when the support is positioned as shown in Figure 9; the arms 10 and extensions 11 being so proportioned as to permit of the extensions 11 yielding outwardly in the operation of attaching the support to the receptacle and thereby operating by their own resiliency to bind on the receptacle. The central portion 12 of the support 9 is provided with a central opening 13 through which shaft 6 extends and a boss 14 connected to shaft 6 is provided for the purpose of preventing upward displacement of the shaft with respect to the support and further providing an enlargement for engaging the support and moving the same upwardly when the shaft is elevated in the operation of detaching the support from the receptacle. 15 indicates generally a hollow core. This element is by preference formed of metal of good heat conductivity and is provided with a cylindrical chamber 16 formed by the concentric circular side walls 17 and 18 each of which is imperforate and continuous. The bottom plate 19 connects the lower ends of the side walls 17 and 18 and a top plate 20 connects the upper ends of these walls, the said top and bottom plates by their presence operating in conjunction with the side walls 17 and 18 to render the chamber 16 fluid tight. An annular tubular manifold 21 is disposed in the upper end of chamber 16 and is supported therein in any suitable manner as by an inlet or feed pipe 22 which extends through support 9 to which it is suitably fastened against independent movement, and through top plate 20 and to manifold 21 to which it is fixedly secured and connected so as to communicate with the interior of the manifold; any suitable construction being provided for effecting a tight joint between the parts. A series of tubular extensions 23 depend from manifold 21 and each of these extensions is provided with a plurality of perforations 24. The tubular extensions 23 may extend for substantially the length of chamber 16 and may, if so desired, be open at their lower ends as shown. The connection between the upper ends 23 and the manifold 21 is such that the extensions 23 communicate with the interior of the manifold. An exhaust herein shown in the form of a tube 25 extends upwardly from the core 15 preferably from the top wall 20 thereof and passes through an opening in which it is snugly fitted in the support 9, the upper open end of the exhaust communicating with the atmosphere. A flexible connection 26 is established between the upper end of feed pipe 22 and a suitable source of supply. When the device is to be used as a medium for lowering the termperature of beverages, the connection 26 which may be of rubber, or rubberized tubing, or its equivalent, will at one end be suitably connected to a fluid pressure tank containing liquefied carbon dioxide or the equivalent of such as is used in connection with the preparation of beverages. A suitable coupling 27 is employed for connecting the extension 26 to the upper end of pipe 22 and operates to prevent leakage at the joint, the flexible connection 26 being provided for the purpose of permitting the shaft 6 and the parts connected thereto to be elevated. With this construction it is obvious that when fluid such as liquid carbon dioxide is directed into chamber 16 through pipe 22 and the parts connected thereto, it is converted into the gaseous state. This transformation causes the absorption of heat from the wall of the chamber and a consequent reduction in the temperature of the body of beverage 8.

This cooling action may take place either before or after the mixing of the beverage or during the operation of mixing the same by the action of shaft 6 and button 7. As shown in Figure 1, a scraper is provided for removing particles of liquid which may freeze on the outer surfaces of core 15. This scraper operates in unison with shaft 6 by rotating therewith and may be economically constructed by imparting to a single length of wire substantially the contour of a U, the limbs 28 and 29 of which are disposed in proximity to the concentric faces of core 15 and one being connected to the shaft 6 by having its upper end bent at right angles as indicated at 30 and fixedly secured to the shaft. A supplemental brace 31 may be provided for connecting the lower end portion of the limb 29 to the lower end portion of shaft 6. This connection between the scraper and shaft 6 provides for the rotation of the scraper with the shaft. The device thus far described is not limited for use in connection with a means for cooling the beverage contained in receptacle 5 but may be readily adapted for functioning as a heater where in instances it is desirable to serve a heated beverage. In this connection the flexible connection 26 may be connected to a suitable reservoir such as a steam boiler, not shown, and thereby convey the steam to the chamber 15 in the manner described in connection with carbonic acid gas. Further the device may be adapted for carbonating liquids for beverage purposes such as water or the like by providing a valve controlled by-pass 32, one end of which is connected to feed pipe 22 and the opposite end directed downwardly so as to be immersed in the beverage 8 when the support is positioned as shown in Figure 1. For purposes of illustration I have shown the by-pass 32 as being directed downwardly through the chamber 16 and extending through the bottom plate 19 thereof, the valve 33 being provided for controlling the passage of the fluid through the by-pass 32.

In operation the support 9 is first elevated above the receptacle 5 and when the same is adjusted on the usual shelf or bracket, not shown, and in alinement with receptacle 5, the support and the parts connected thereto are lowered and this action on the part of the same closes through a switch, not shown, of the usual electric circuit to the motor, not shown, which operates shaft 6. The usual valve on the reservoir for the carbonic acid gas, or the heating agent or the like, as the case may be, and not herein shown, is then opened and fluid permitted thereby to enter chamber 16.

Although I have described an ideal construction for effecting the foregoing results, it should be understood that various changes may be made within the scope of the appended claims without departing from the spirit of the invention.

I claim:

1. In a beverage dispensing apparatus, the combination of a receptacle for holding the beverage to be dispensed, of means extensible into the receptacle and immersible in the beverage for modifying the temperature thereof and including a tube, and means for circulating fluid under pressure through the tube and through the surrounding beverage.

2. In a beverage dispensing apparatus, the combination of a receptacle for holding the beverage to be dispensed, of means extensible into the receptacle and immersible in the beverage for modifying the temperature thereof and including a hollow core, a tube within the core, and means for circulating fluid under pressure through the tube and outwardly through the core and into the beverage surrounding the core.

3. In a beverage dispensing apparatus, the combination of a receptacle for holding the beverage to be dispensed, a support adapted to be connected to the receptacle, means extensible into the receptacle and immersible in the beverage and adapted for agitating the same, and means for modifying the temperature of the beverage and including a tube connected to the support, and means for circulating fluid under pressure through the tube.

4. In a beverage dispensing apparatus, the combination of a receptacle for holding the beverage to be dispensed, a support adapted to be connected to the receptacle, rotatable means extensible into the receptacle and immersible in the beverage for agitating the same, means for modifying the temperature of the beverage and including a hollow core connected to the support and means for circulating fluid under pressure through the core.

5. In a beverage dispensing apparatus, the combination of a receptacle for holding the beverage to be dispensed, of a support extensible over the upper end of the receptacle, an agitator carried by the support and extensible into the receptacle and immersible in the beverage contained therein, means for modifying the temperature of the beverage and including a hollow core carried by the support and immersible in the beverage and surrounding the agitator, means for circulating fluid under pressure through the core, and a scraper arranged for operating upon the surface of the core and connected to the agitator.

CHARLES FERGUSON.